United States Patent [19]

Al Ghatta et al.

[11] Patent Number: 5,422,381
[45] Date of Patent: Jun. 6, 1995

[54] FOAMED CELLULAR POLYESTER RESINS AND PROCESS FOR THEIR PREPARATION

[75] Inventors: Hussain A. K. Al Ghatta, Fiuggi; Tonino Severini, Colleferro; Lûca Astarita, Naples, all of Italy

[73] Assignee: M. & G. Richerche S.p.A., Pozzilli, Italy

[21] Appl. No.: 275,234

[22] Filed: Jul. 14, 1994

Related U.S. Application Data

[62] Division of Ser. No. 98,341, Sep. 28, 1993, Pat. No. 5,362,763.

[30] Foreign Application Priority Data

Dec. 16, 1991 [IT] Italy .................. MI91A3366

[51] Int. Cl.⁶ .................. C08J 9/08; C08J 9/14
[52] U.S. Cl. .................. 521/182; 521/79; 521/81; 521/138
[58] Field of Search .................. 521/182, 138, 81, 79

[56] References Cited

U.S. PATENT DOCUMENTS

| | | | |
|---|---|---|---|
| 4,002,581 | 1/1971 | Dolce | 521/138 |
| 4,097,421 | 6/1978 | Chang | 521/90 |
| 4,284,596 | 8/1981 | Inokuchi et al. | 264/101 |
| 4,857,396 | 8/1989 | Otonari et al. | 428/315.5 |
| 4,871,784 | 10/1989 | Otonari et al. | 521/138 |
| 5,000,991 | 3/1991 | Hayashi et al. | |
| 5,124,098 | 6/1992 | Vischer | 521/182 |
| 5,288,764 | 2/1994 | Rotter et al. | 521/81 |
| 5,340,846 | 8/1994 | Rotter et al. | 521/182 |

FOREIGN PATENT DOCUMENTS

| | | |
|---|---|---|
| PCT/NL90/-00152 | 3/1991 | European Pat. Off. |
| 0442759A2 | 8/1991 | European Pat. Off. |
| PCT/EP92/-00667 | 10/1992 | European Pat. Off. |
| PCT/EP92/-00668 | 10/1992 | European Pat. Off. |
| PCT/EP92/-00669 | 10/1992 | European Pat. Off. |
| PCT/EP92/-00670 | 10/1992 | European Pat. Off. |
| PCT/EP92/-02375 | 4/1993 | European Pat. Off. |
| WO90110667 | 9/1990 | WIPO |

OTHER PUBLICATIONS

Abstract: JP 1009244, "Polyester Film Containing Microcell," JPO and Japio, Diafoil Co., Ltd.
Abstract: JP 57038119, "Preparation of Stringy Polyester Foam," JPO and Japio, Teijin Ltd.

*Primary Examiner*—Morton Foelak
*Attorney, Agent, or Firm*—Edward D. Manzo; Ted K. Ringsred

[57] ABSTRACT

A foamed cellular material from polyester resins is obtained by extrusion foaming of polyester resins having melt strength higher than 8 centinewton, intrinsic viscosity greater than 0.8 dl/g and complex melt viscosity higher than 25,000 poises.

15 Claims, No Drawings

FOAMED CELLULAR POLYESTER RESINS AND PROCESS FOR THEIR PREPARATION

This application is a divisional of U.S. application Ser. No. 08/098,341, filed on Sep. 28, 1993, now U.S. Pat. No. 5,362,763.

The present invention refers to foamed cellular polyester resins and processes for their preparation.

The commercial foamed cellular polymers, such as foamed polystyrene and polyurethane, find wide application in the building, packing and padding sectors.

The foamed cellular polyester resins have up to now found little application due to the not satisfactory properties of the foamed polyester materials till now produced.

European application 0 372 846 describes foamed cellular polyester resins obtained by extrusion foaming of polyester resins added with anhydrides of tetracarboxylic acids. Pyromellitic anhydride is the preferred additive and the possibility of using amounts thereof up to 5% by weight is disclosed.

The obtained foamed cellular materials are not homogeneous and need thermal post-treatments either to obtain more homogeneous foamed structures with finer cells and to develop heat stability characteristics of the formed articles.

It is also necessary that the foamed articles be quickly cooled after the extrusion foaming step to temperatures lower than the Tg of the polyester resin. This to the effect of maintaining the crystallinity of the resin to relatively low values (lower than about 15%). U.S. Pat. No. 4,132,702 describes branched polyester resins obtained by solid state reaction of polyester resins added with branching agents containing at least three reactive groups capable of forming ester groups.

Examples of said branching agents are pentaerythritol, tri- and tetracarboxylic acids and their esters, such as trimesic and piromellitic acids.

The obtained branched polyesters show high melt strength values combined however with relatively low values of the melt viscosity.

There are described also modified polyester resins having melt viscosity sufficiently high combined, however with low values of the melt strength. The intrinsic viscosity of the branched resins is higher than 1.2 dl/g.

The above cited modified polyester resins are indicated as suitable to prepare foamed materials. No examples and data on the characteristics of the foamed materials are given.

It has now unexpectedly found that it is possible to prepare foamed cellular polyester resins having valuable morphological and mechanical properties by subjecting to extrusion foaming polyester resins having the following characteristics:
  melt strength higher than about 8 centinewton;
  complex melt viscosity higher than about 25,000 poises;
  intrinsic viscosity higher than 0.8 dl/g.

Foamed cellular polyester resins endowed of particularly valuable properties are obtained by extrusion foaming of resins having melt strength comprised between 15 and 30 centinewton or higher, melt viscosity between 30,000 and 50,000 poises or higher and intrinsic viscosity between 0.85 and 1.95 dl/g.

The complex viscosity and the melt strength are measured at 270° C. according to the analytical procedure reported in the examples. As therein indicated, in case of incomplete melting of the resin at 270° C., the determination is carried out at 290° C. The values corresponding to the minimum values of melt strength and complex viscosity measured at 270° C. are set forth in the analytical procedure.

The properties above indicated are shown by the resins before extrusion foaming; similar properties are also possessed by the resin after foaming.

The foamed cellular polyester resins of the invention show mechanical properties superior to the commercial foamed resins such as foamed polystyrene (STIRODUR from Bayer) and foamed polyurethane resins.

For example the compression set is higher; while the foamed polyester resins do not collapse up to compression of 15-20% the commercial foamed resins do not resist to compressions higher than about 8%.

The foamed cellular polyester resins of the invention moreover are more rigid with respect to the commercial resins; the flexural rigidity is higher than 3 MPa and the flexural modulus is generally comprised between 20-120 MPa; whereas in the case of STIRODUR and the foamed polyurethane resins the values are respectively comprised between 2-3 MPa and 17-18 MPa.

The density of the resins is generally comprised between 40 and 500 kg/m$^3$. The cells have dimension comprised between 50 and 200 microns and more particular between 50 and 120 microns. The cells are prevailingly or totally closed. The wall thickness is comprised between 40 and 100 microns.

A method for obtaining the foamed polyester resins of the invention comprises extruding a polyester resin having intrinsic viscosity higher than about 0.52 dl/g added of a dianhydride of a tetracaboxylic acid, particularly an aromatic acid in amounts from about 0.1 and 1% by weight, subjecting the resin to solid state upgrading up to obtain a final viscosity of 0.85-1.95 dl/g and then extrusion foaming the resin. The extrusion foaming can be carried out in the presence of amounts from 0.1 to 1% by weight of a dianhydride of a tetracarboxylic acid in both cases, pyromellitic dianhydride is the preferred dianhydride.

The preferred method for obtaining the polyester resin comprises upgrading the resin in the presence of a dianhydride of a tetracarboxylic acid up to obtain I.V. values comprised between 1.0 and 1.95 dl/g and then subjecting the resin to extrusion foaming.

The conditions of the solid state upgrading of polyester resins in the presence of dianhydride of tetracarboxylic acids are known in literature (see for example European application 86830440.5 whose description is herein incorporated for reference). Upgrading temperatures comprised between 170° C. and 220° C. are suitable.

Residence times in the upgrading reactor higher than about 1 h are generally used.

The residence times in the case of extrusion in monoscrew extruders are comprised between about 3 and 10 minutes.

Any foaming or expanding agent can be used for foaming the resins of the invention.

Easily vaporizable liquids and thermally decomposable compounds can be used. Inert gas can be used, such as $CO_2$.

The saturated aliphatic, cycloaliphatic hydrocarbons, the aromatic hydrocarbons and the hologenated hydrocarbons are preferred. Examples of usable hydrocarbons are butane, pentane, hexane, cyclohexane, trichloromonofluoromethane, 1,2-dichlorotetrafluoroethane.

Generally the foaming agent is injected into the melted mixture through openings in the initial part of the extruder.

The used amount can arrive at 20-30% by weight of the melted mixture. Preferably the quantity is comprised between 1-5% by weight in the case of the chlorofluorohydrocarbons.

Any type of extruder suitable for the extrusion foaming can be used; single screw, twinscrew or pluriscrew extruders can be used.

In order to improve the structural characteristics of the cells obtaining finer and more uniformly distributed cells, the polyester resin can be added with amounts up to 5% by weight of a compound of a metal from I to III group of the periodic system, such as for example sodium carbonate, calcium carbonate, aluminium or magnesium stearate, aluminium or magnesium myrisate, sodium terephtalate.

The resins may contain stabilisers, nucleating agents, flameretardants, and similar additive normally used in the polyester resins.

The polyester resins usable are the resins obtainable by polycondensation of an,aromatic bicarboxylic acid with a diol. Examples of aromatic acids are terephalic and isophtalic acids naphtalendicarboxylic acids and diphenylether dicarboxylic acid.

Examples of glycols are ethylenglycol, tetraethylenglycol, cyclohexandimethanol, 1,4-butandiol. Polyetheleneterephthalate copolymers containing up to 20% of units deriving from isophthalic acid are the preferred resins. The starting resins have intrinsic viscosity higher than about 0.52 dl/g and before being foaming extruded are dried to humidity values lower than 200 ppm, preferably below 100 ppm. Recycled polyester resins can also be used; the upgrading and foaming treatments are similar to the ones of the non-recycled resins.

After extrusion foaming, the foamed resin generally obtained in the form of a panel or having a cylindrical profile, is cooled to temperatures below the Tg of the polyester. This to maintain the cristallinity of the polyester resin below about 15%. In order to confer resistance to thermal deformation to the formed articles to be used in thermal cycles such as food containers to be heated in a microwave oven, it is convenient to subject the articles to thermal treatment to temperatures higher than 60° C., generally comprised between 60° C. and 120° C. for times up to about 5 minutes.

The following examples are given to illustrate and not to limit the invention.

COMPARATIVE EXAMPLE 1

50 kg/h of polyetheleneterephthalate (PET) having intrinsic viscosity of 0.80 dl/g were fed in continuous to a single screw blow extruder having the following characteristics:

| | |
|---|---|
| diameter of the screw: | 90 mm |
| screw ratio length/diameter: | 30 |
| The test conditions were as follows: | |
| temperature of the melting zone: | from 224° to 260° C. |
| temperature of the injection zone: | 240° C. |
| temperature of the cooling zone: | from 240° to 220° C. |
| temperature of the head: | from 240° to 275° C. |
| temperature of the melt: | 224° C. |
| pressure of the melt: | 5.2 MPa |
| runs of the screw: | 24 RPM |
| blowing agent: | trichlorofluoromethane (HCFC; 3% by weight on the total polymer) |
| nucleating agent: | talc (0.8% by weight on the total polymer) |
| average residence time in the extruder: | 4.5 minutes. |

A ring die having a diameter of 40 mm was used for the extrusion.

No foamed material was obtained; the material was not foamable due to the too low melt strength (for the melt strength value and other data see Table 1).

Other blowing agents such as nitrogen, ethyl alcohol, carbon dioxide were used in various preparations, but without obtaining foamed materials.

COMPARATIVE EXAMPLE 2

The test of comparative example 1 was repeated with the difference that PET with I.V. of 0.92 dl/g was fed (upgraded to I.V. value of 0.92 by solid state polyaddition reaction starting from PET with I.V.=0.70 dl/g added with 0.15% by weight of pyromellitic dianhydride).

No foamed material was obtained.

In Table 1 are reported the rheological characteristics of the PET used.

EXAMPLE 1

The test of comparative example 1 was repeated with the difference that PET with I.V. of 0.82 dl/g was fed (obtained by solid state upgrading reaction at 180° C. of PET with I.V.=0.71 dl/g added with 0.15% by weight of pyromellitic dianhydride) and contemporaneously also pyromellitic dianhydride in quantity of 500 g/h was fed in continuous through the feeding port of the extruder.

The melt temperature in the extruder was 259° C.; the pressure 9.1 MPa.

A foamed material with regular closed cells was obtained.

The bulk density of the material was 150/180 kg/m$^3$.

The compression set was 1.5 MPa; the compression modulus 15.4 MPa and the specific flexural resistance 10 MPa m$^3$/kg.

The tensile strength was 3.3 MPa; the tensile modulus 80.7 MPa and the specific tensile strength 22/18 MPa m$^3$/kg.

EXAMPLE 2

The test of comparative example 1 was repeated with the difference that PET with I.V.=1.17 dl/g was fed (the polyester was obtained by solid state upgrading of PET with I.V.=0.75 dl/g added with 0.15% of pyromellitic dianhydride, the upgrading having been continued up to obtain the I.V. value of 1.17 dl/g).

A foamed material was obtained with regular closed cells, having the following characteristics:

| | |
|---|---|
| bulk | 100/120 kg/m$^3$ |
| compression set: | 1 MPa |
| compression modulus: | 4.0 MPa |
| flexural rigidity: | 4.8 MPa |
| flexural modulus: | 25 MPa |
| specific flexural resistance: | 48/40 MPa m$^3$/kg |
| specific tensile strength: | 10/8 MPa m$^3$/kg |

In Table 1 are reported the rheological characteristics of the PET used.

EXAMPLE 3

The test of comparative example 1 was repeated with the difference that PET with I.V.=0.823 dl/g was fed; this PET was obtained from PET with I.V.=0.75 dl/g added with 1.15% of pyromellitic dianhydride upgraded up to obtain I.V.=0.832 dl/g.

The average residence time was 8 minutes.

Foamed material was obtained with prevailingly closed cells.

The rheological characteristics of the PET added with pyromellitic dianhydride are reported in Table 1.

In Table 1 are reported the rheological characteristics of the polyester resins used in the examples; the values of the melt viscosity and the elastic modulus $G'$ are those at point of maximum.

The determination was carried out measuring the variation of this property versus time.

The measurements were carried out with a Rheometrics plate and cone rheometer and with a rheograph Geottfert Rheograph 2002 having a capillary die.

Unless otherwise indicated, all the rheological measurements reported in the specification and in the examples were carried out at 270° C.

The specimens in the form of granules were dried under vacuum at 110° C. for at least 12 hours. The chips were melted and compressed in the chamber before starting the measurements.

The time sweeps were conducted with an angle of 0.1 rad and with a diameter of the cone of 25 mm. The frequency was 10 rad/sec with a deformation of 25% with time of 1 hour.

The frequency sweeps were conducted with a frequency in the range of 0.1-100 rad/sec and with deformation of 1%.

In the measurements with the capillary rheometer Goettfert, the samples were introduced into the rheometer in nitrogen flow to assure the stability of the material during the test.

The deformation rate was in the range of 20 to 2000 sec−1. The capillary geometry was 30 mm length and 1 mm diameter of the die with an entrance angle of 90°.

The melt strength was measured extruding a filament of polymer in the capillary of the Goettfert rheometer with piston rate of 0.2 mm/sec.

The filament was taken between steel toothed wheels and there was applied a linear acceleration of the peripheric speed. The acceleration was 60 mm/sec² and the reported strain was the force that the filament applied to the wheels at the maximum speed (1000 mm/sec).

All the rheometric measurements were conducted according to ASTM D 4440 and calculations where made according to ASTM D 4065.

In case of incomplete melting of the resin at 270° C., the measurements were carried out at 290° C. using for the melt strength a diameter of the die of 2 mm. The value of the melt strength at 290° C. and using a diameter of the die of 2 mm corresponding to the minimum value of 8 centinewton at 270° C. and using a diameter of the die of 1 mm is 2-3 newton; the value for the complex viscosity at 290° C. corresponding to the 25,000 poises at 270° C. is 15,000 poises.

The data on the compression set measurements, flexural rigidity and flexural modulus were obtained according to ASTM D 1621, D 790 and D 1623 respectively.

The intrinsic viscosity was determined in solutions of 0.5 g polyester resin in granule in 100 ml of a 60/40 weight mixture of phenol and tetrachloroethane at 25° C., operating according to ASTM 4063-86.

TABLE 1

| Polyester | I.V. dl/g | Melt Strength centinewton | Complex viscosity Poise $10^4$ | Elastic modules dine/cm² $10^4$ |
|---|---|---|---|---|
| Comp. Ex. 1 | 0.80 | 0.2 | 1.05 | 1.04 |
| Comp. Ex. 2 | 0.92 | 4.2 | 2.5 | 21.8 |
| Example 1 | 0.862 | 25 | 3.59 | 26.0 |
| Example 2 | 1.18 | 20 | | |
| Example 3 | 0.823 | 10-12 | 6.23 | 43.2 |

EXAMPLE 4

The test of comparative example 1 was repeated with the only difference that PET with I.V.=1.95 dl/g was fed (the PET was obtained by solid state upgrading reaction at 215° C. of PET of recyle having I.V.=0.74 dl/g added with 0.3% by weight of pyromellitic dianhydride).

The rheological properties of the used PET were: melt strength 43 centinewton (measured at 290° C. with a diameter of the die of 2 mm); complex viscosity 40 poise $10^4$ and elastic modulus $G'$ 100 dine cm² $10^4$ (both the determinations were carried out at 290° C.).

The temperature of the melt in the extruder was 259° C.; the pressure of 9.1 MPa.

A foamed material was obtained with regular closed cells; the bulk density of the material was 50/80 kg/m³. The compression set was 20 MPa; the compression modulus 17.0 MPa the specific compression resistance 11.6 MPa m³/kg.

The flexural rigidity was 7.4 MPa and the flexural modulus 64 MPa; the specific flexural resistance 44/36.1 MPa m³/kg. The tensile strength was 4.0 MPa; the modulus at yield 83 MPa and the specific resistance to yield 24/29 m³/kg.

EXAMPLE 5

The test of comparative example 1 was repeated with the difference that PET having I.V.=1.52 dl/g was fed. The PET was obtained by solid state upgrading reaction at 215° C. of PET with having I.V.=0.60 dl/g added with 0.15% by weight of pyromellitic dianhydride.

The rheological characteristics of PET were: melt strength 9.5 centinewton (measured at 290° C. with a diameter of the die of 2 mm); complex viscosity 4 poise $10^4$; elastic modulus 85 dine/cm² $10^4$ (both the determinations were carried out at 290° C.).

The temperature of the melt in the extruder was 259° C.; the pressure 9.1 MPa.

A foamed material was obtained with regular closed cells. The bulk density was 70/180 kg/m³; the compression set 1.6 MPa, the compression modulus 16 MPa and the specific resistance to compression 11.2 MPa m³/kg.

The flexural rigidity was 6.2 MPa and the flexural modulus 59 MPa. The specific flexural resistance 42/35.1 MPa m³/kg. The tensile strength was 3.6 MPa; the modulus at yield 81 MPa and the specific resistance at yield 23/19 m³/kg.

We claim:

1. A foamed cellular material from polyester resins obtained by extrusion foaming polyester resins having melt strength higher than 8 centinewton, intrinsic viscosity greater than 0.8 dl/g and complex melt viscosity higher than 25,000 poises.

2. Foamed articles obtained from the foamed materials of claim 1.

3. An extrusion foamed cellular material comprised of polyester resins having melt strength higher than 8 centinewton, intrinsic viscosity greater than 0.8 dl/g and complex melt viscosity higher than 25,000 poises.

4. A foamed cellular material according to claim 1, wherein the polyester resins have a melt strength comprised between 15 and 30 centinewton, complex melt viscosity between 30,000 and 50,000 poises and intrinsic viscosity between 0.85 and 1.95 dl/g.

5. An extrusion foamed material according to claim 3, wherein the polyester resins have melt strength comprised between 15 and 30 centinewton, complex melt viscosity between 30,000 and 50,000 poises and intrinsic viscosity between 0.85 and 1.95 dl/g.

6. A foamed cellular material according to claim 1 having density comprised between 40 and 500 kg/m$^3$.

7. A foamed article according to claim 2 having density comprised between 40 and 500 kg/m$^3$.

8. A foamed article according to claim 3 having density comprised between 40 and 500 kg/m$^3$.

9. A foamed material according to claim 1, wherein the polyester resin is polyetheleneterephthalate or copolyetheleneterephthalate containing up to 20% of units of isophthalic acid.

10. A foamed material according to claim 2, wherein the polyester resin is polyetheleneterephthalate or copolyetheleneterephthalate containing up to 20% of units of isophthalic acid.

11. An extruded foamed material according to claim 2, wherein the polyester resin is polyetheleneterephthalate and copolyetheleneterephthalate containing up to 20% of units of isophthalic acid.

12. An extruded foamed material according to claim 3, wherein the polyester resin is polyetheleneterephthalate and copolyetheleneterephthalate containing up to 20% of units of isophthalic acid.

13. An extruded foamed material according to claim 5, wherein the polyester resin is polyetheleneterephthalate and copolyetheleneterephthalate containing up to 20% of units of isophthalic acid.

14. A foamed article according to claim 2 having density comprised between 40 and 500 kg/m$^3$.

15. A foamed article according to claim 3 having density comprised between 40 and 500 kg/m$^3$.

* * * * *